United States Patent [19]

Englander

[11] Patent Number: 5,576,899

[45] Date of Patent: Nov. 19, 1996

[54] MIRROR MOUNT FOR VEHICLES

[75] Inventor: Sol Englander, Flushing, N.Y.

[73] Assignee: Rosco, Inc., Queens, N.Y.

[21] Appl. No.: 29,928

[22] Filed: Mar. 11, 1993

Related U.S. Application Data

[63] Continuation of Ser. No. 709,390, Jun. 3, 1991, abandoned.

[51] Int. Cl.$^6$ ............................. G02B 7/182; A47G 1/16; B60R 1/06
[52] U.S. Cl. .................... 359/871; 359/872; 359/881; 248/475.1; 248/476; 248/541; 248/74.4
[58] Field of Search ....................... 350/631, 632, 350/639; 248/475.1, 476, 479, 487, 477, 74.1, 74.4, 316.1, 316.6, 534, 535, 540, 541; 359/871, 872, 881

[56] References Cited

U.S. PATENT DOCUMENTS

| 3,981,474 | 9/1976 | Szilagyi | 248/487 |
|---|---|---|---|
| 4,030,692 | 6/1977 | Szilagyi | 248/487 |
| 4,166,651 | 9/1979 | Vandenbrink et al. | 248/487 |
| 4,500,063 | 2/1985 | Schmidt et al. | 248/475.1 |
| 4,715,701 | 12/1987 | Urban | 359/871 |
| 4,909,619 | 3/1990 | Eifert | 350/639 |
| 4,988,178 | 1/1991 | Eifurt | 350/631 |
| 5,005,963 | 4/1991 | Schmidt et al. | 359/871 |
| 5,025,543 | 6/1991 | Byers et al. | 350/604 |
| 5,028,029 | 7/1991 | Beck et al. | 248/479 |

Primary Examiner—Ricky D. Shafer
Attorney, Agent, or Firm—Ostrolenk, Faber, Gerb & Soffen, LLP

[57] ABSTRACT

A mount for securing the staff of a mirror to a vehicle includes a plastic, integrally molded body which defines an interior chamber with a peripherally extending edge shaped to mate and fit the vehicle surface to which the mount body is to be secured. A clamping plate is disposed within the interior chamber and several screws, accessible through the exterior of the mount body, engage the mounting plate and are capable of being tightened to pull the clamping plate and thus secure between the interior surface of the mount body and the clamping plate the staff which holds the mirror element.

6 Claims, 2 Drawing Sheets

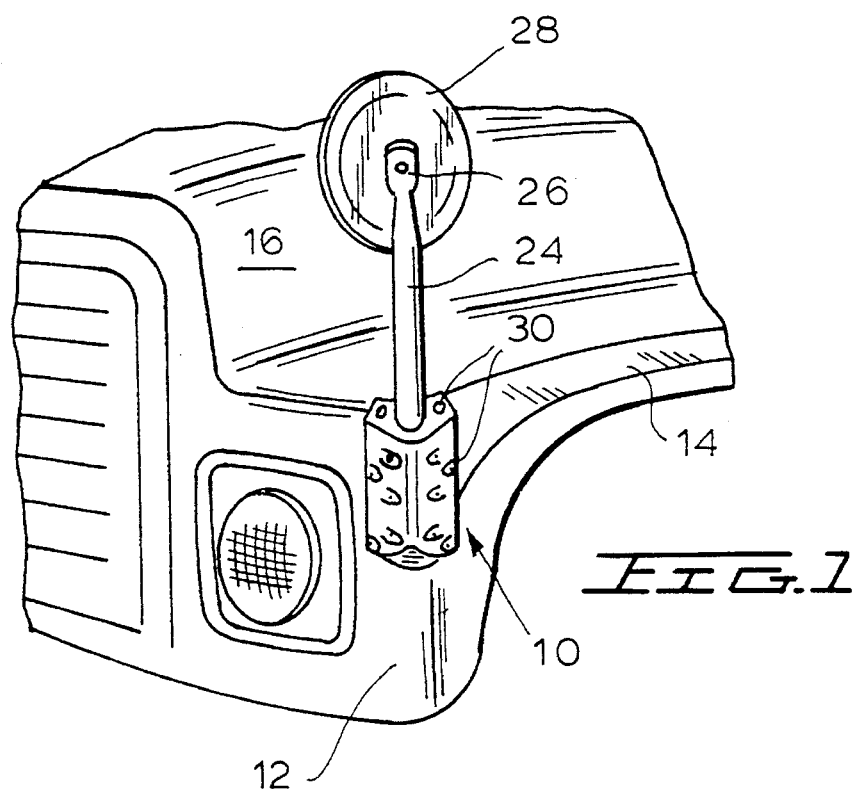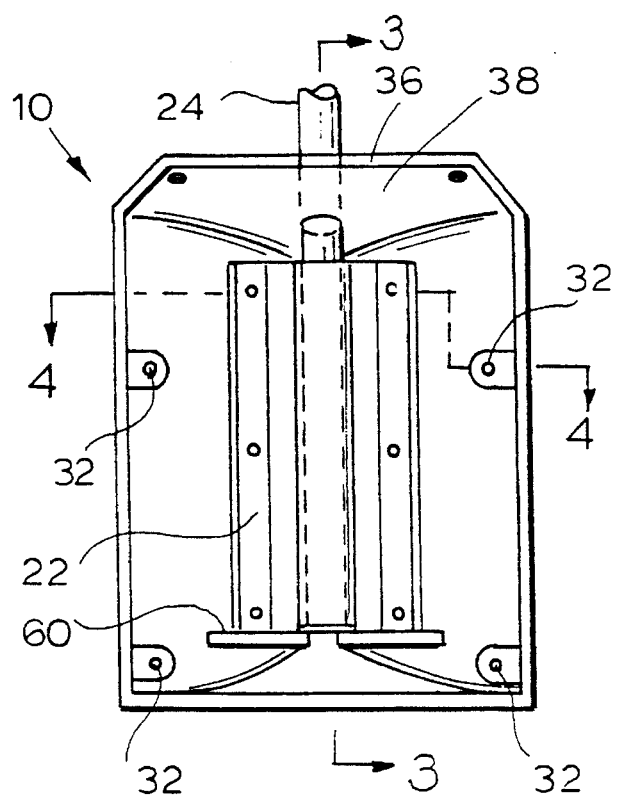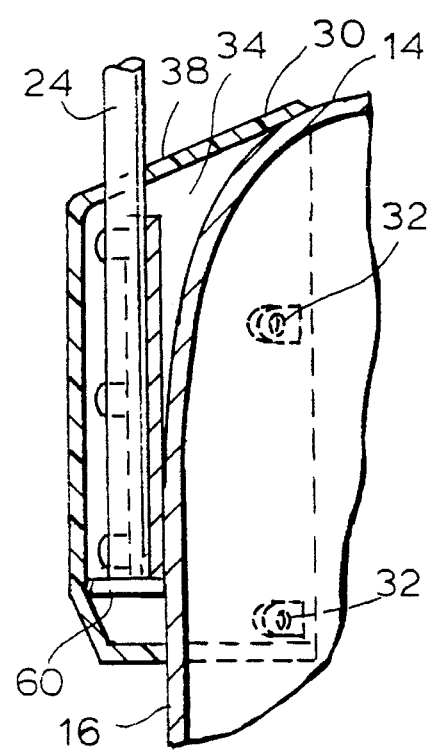

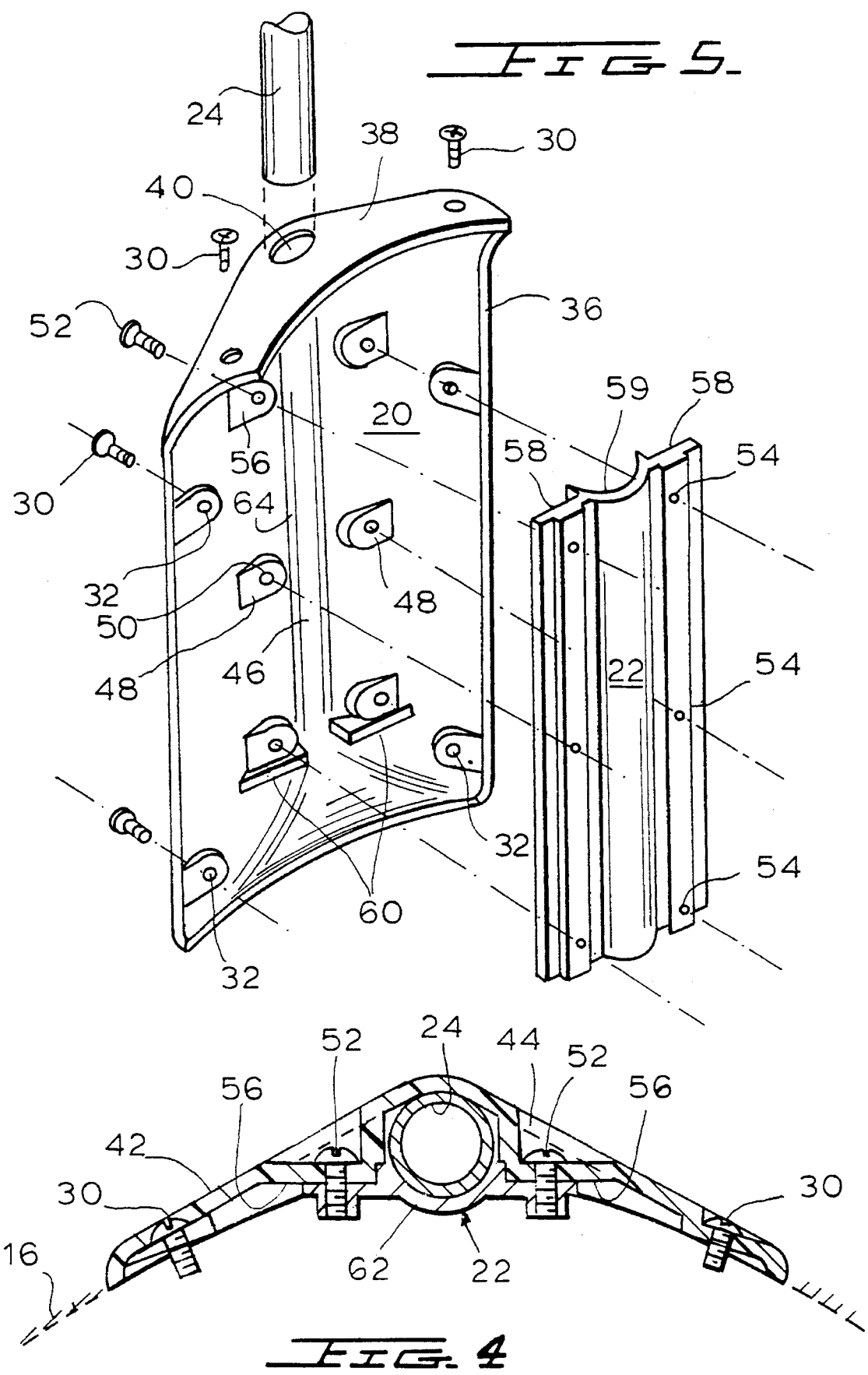

5,576,899

MIRROR MOUNT FOR VEHICLES

This is a continuation of application Ser. No. 07/709,390, filed on Jun. 3, 1991 now abandoned.

BACKGROUND OF THE INVENTION

The present invention generally relates to a mirror mount for vehicles and more particularly to a mount attachable to the body of a vehicle and adapted to securely hold the pole or staff of an automotive mirror.

Motor vehicles, and in particular larger vehicles such as buses, trucks and the like, require an array of mirrors mounted on exterior surfaces of such vehicles in order to improve the visibility and field of view of the driver in and around the vehicle. Typically, an automotive mirror element has attached to it a staff or pole and that pole is secured within a mount which is in turn attached to the body of the vehicle.

The present invention concerns itself with the mount per se and specifically with a mount of the type which can be attached to the body of the vehicle, for example to the fenders, and also, if desired, to the back of the mirror element to serve the mirror staff therein.

Mirror mounts for vehicles have been described in several issued patents including in U.S. Pat. Nos. 2,969,715, 3,592,532 and 4,165,156. However, the present invention could be characterized as an improvement of the mirror mount that is described in U.S. Pat. No. 4,500,063. The 4,500,063 patent illustrates and describes a front-wheel fender mount for securing the pole of a mirror which mount includes a base member with an inner surface designed to be secured to the curved front portion of the fender and an opposite outer surface. A cover member is in turn secured to the outer surface of the base member, the cover member and the base member having portions which define a cavity therebetween for securing the lower end, i.e. the pole of the mirror therein.

More specifically, the cover member has a plurality of transverse ribs which extend perpendicularly to the longitudinal axis of the cover member. These ribs form bearing surfaces which are intended to frictionally bear and press against the mirror pole. In the base member, the 4,500,063 patent provides regions where the body of the base member is reinforced to provide strength at the location of apertures in which self-tapping screws are screwed in order to tightly secure the cover and base members to one another.

Generally, the mirror mount of the 4,500,063 patent requires molding of a pair of intricately shaped plastic parts, and require for their implementation more plastic material and comparatively more expensive molds.

Further, the need to tightly secure the two plastic parts to one another presents a reliability problem involving plastic creep. In this connection, it is noted that mirrors on vehicles typically project outside the main vehicle body and are most likely to collide with other objects and most prone to be damaged accidentally or, in the case of school buses, sometimes intentionally due to the playfulness of youngsters.

Also, the need to define a precisely shaped bore between the cover and base members in the device of the 4,500,063 patent requires more precisely formed and more frequently replaced molds, resulting in greater cost for molds and more expensive mirror mounts. A two-piece plastic mirror mount design is also less sturdy and the fact that a cover piece is fitted to a base piece presents an aesthetically less-pleasing appearance.

SUMMARY OF THE INVENTION

Accordingly, the general object of the present invention is to provide a substantially improved mirror mount.

It is a further object of the present invention to provide an aerodynamically and aesthetically improved mirror mount.

It is a still further object of the present invention to provide a mirror mount which is less susceptible to plastic creep, less intricately shaped, and which is sturdier and less expensive.

The foregoing and other objects of the present invention are realized by a mirror mount comprising a single piece, integrated mount body which defines an interior chamber in which the mirror pole is insertable through a top opening in the mount body. The mount body has a peripheral edge which is shaped to precisely fit the vehicle surface to which the mount body is to be secured, for example, the fender surface of a vehicle, another portion of the vehicle, or even the flat back of a mirror element.

Within the interior chamber of the mount body is a clamping plate, preferably metallic, that is held by several screws which are accessible from the front of the mount body. These screws are designed to be tightened, to thereby pull the clamping plate toward the interior surface of the mirror mount in a manner which enables the clamping plate to bear tightly against the mirror pole and thus secure it in place.

Other features and advantages of the present invention will become apparent from the following description of the invention which refers to the accompanying drawing.

BRIEF DESCRIPTION OF THE DRAWINGS

FIG. 1 is a perspective view showing the mirror mount of the present invention secured to the corner, at the left fender of a bus.

FIG. 2 is a rear view of the mirror mount of the present invention.

FIG. 3 is a cross-section through line 3—3 in FIG. 2, showing additionally the vehicle surface to which the mirror mount is secured.

FIG. 4 is a cross-section through line 4—4 in FIG. 2.

FIG. 5 is an exploded view of the mirror mount of the present invention.

DETAILED DESCRIPTION OF THE DRAWINGS

Referring to the drawings, FIG. 1 shows the mount 10 of the present invention fastened to the front curved portion 12 of a fender 14 of a vehicle 16. The vehicle 16 may be a school bus, truck, van, automobile or indeed any vehicle.

The mount itself consists (see FIG. 5) of a mount body 20 and a clamping plate 22 which together firmly hold and secure therebetween one end of a mirror pole 24 (FIG. 1) which holds at its other distal end 26 a mirror element 28.

The mirror body 20 is attachable to the vehicle 16 by several metal screws 30 located around the periphery of the mount body 20. These screws 30 are insertable through screw opening 32 as shown in FIGS. 1 and 5.

The mount body 20 defines an interior chamber 34 (FIG. 3) which is circumscribed and defined by a peripheral side edge 36 (FIGS. 2 and 3), the peripheral side edge 36 being shaped and configured to precisely fit and mate with the vehicle surface such as the fender surface of the vehicle 16 to which the mount body 20 is to be secured. At the top, the mirror body 20 has a sloping panel 38 defining an opening 40 through which the mirror pole 24 is insertable into the interior chamber 34. The mirror mount body further includes a pair of side panels 42 and 44 (FIG. 4) which gently slope toward one another and define a nestling region 46 for the mirror pole 24. The nestling region 46 is flanked on its left and right sides with a plurality of spaced, thickened, reinforced portions 48 (FIG. 5) of the mount body 20 which serve dual purposes including defining access holes 50 for metal tightening screws 52 which are screwable into the threaded screw holes 54 in the clamping plate 22. The thickened portions 48 also aid in limiting side-to-side movement of the mirror pole 24 before the plate 22 has been tightened.

The flats 56 on the thickened portions 48 provide rest pads for corresponding flats 58 of the clamping plate 22. Between the flats 58, the clamping plate 22 has a centered, curved, semi-cylindrical channel 59 facing the nestling region 48 in the mount body 20 and dimensioned to tightly engage the mirror pole 24 upon tightening of the clamping plate 22 by means of the screws 52.

A pair of transversely extending ribs 60 disposed below the thickened portions 48 of the mount body 20 serve as stops which limit the degree of penetration of the mirror pole 24 into the interior chamber 34 of the mount body 20.

Installation and use of the mount body of the present invention is exceedingly simple and straightforward. The mount body comes with the tightening screws 52 already loosely threaded into and holding the clamping plate 22. The mount body 20 is then secured to the vehicle 16 by means of the metallic screws 30 which engage appropriately located screw openings in the vehicle or by means of self-tapping screws which may be screwed into pilot holes in the fender. Thereafter, the mirror pole 24 may be conveniently and easily inserted through the opening 40, with the bottom end of the pole 24 resting against the stop ribs 60 in the mount body 20. The screws 50 are then tightened, pulling the metallic clamp 22 toward the interior surface of the mount body 20, firmly securing by friction the pole 24 and thereby the mirror 28 in place on the vehicle.

If desired, the interior surface of the semi-cylindrical channel 59 of the metallic plate 22 may be lined with longitudinally extending grooves 62 which serve to aid in preventing rotation of the pole 24 within the channel 59. Similar grooves or protrusions 64 may be provided inside the mount body 20, in the nestling region 46 thereof.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror mount, comprising;
   a mount body, formed as an integrally molded plastic piece, having an interior surface facing and defining an interior chamber, and a periphery shaped to mate with an external surface of a vehicle body to which the mount body is attachable in a manner such that the interior surface of the mount faces the external surface, the interior chamber being constructed so that when the mount body is mounted to the external surface of the vehicle body the interior chamber is substantially closed off, the mount body comprising a pair of panels which converge toward one another and define a nestling region for a mirror pole;
   securing means for fixedly securing the mount body in contact with the external surface of the vehicle body;
   a clamping plate fully disposed within the interior chamber;
   tightening means accessible and operable from an exterior surface of the mount body and effective for engaging the clamping plate and pulling the same toward the interior surface;
   wherein the clamping plate is fabricated of metal;
   wherein the tightening means comprises a plurality of threaded holes in the clamping plate and screw means passing through the mount body and engageable with the threaded holes in the clamping plate; and
   further comprising at least one rib in the mount body providing a stop for the mirror pole.

2. A mirror mount, comprising:
   a mount body, formed as an integrally molded plastic piece, having an interior surface facing and defining an interior chamber, and a periphery shaped to mate with an external surface of a vehicle body to which the mount body is attachable in a manner such that the interior surface of the mount faces the external surface, the interior chamber being constructed so that when the mount body is mounted to the external surface of the vehicle body the interior chamber is substantially closed off, the mount body comprising a pair of panels which converge toward one another and define a nestling region for a mirror pole;
   securing means for fixedly securing the mount body in contact with the external surface of the vehicle body;
   a clamping plate fully disposed within the interior chamber;
   tightening means accessible and operable from an exterior surface of the mount body and effective for engaging the clamping plate and pulling the same toward the interior surface;
   wherein the clamping plate defines a semi-cylindrical channel for the mirror pole;
   wherein the clamping plate is fabricated of metal;
   wherein the tightening means comprises a plurality of threaded holes in the clamping plate and screw means passing through the mount body and engageable with the threaded holes in the clamping plate; and
   further comprising at least one rib in the mount body providing a stop for the mirror pole.

3. A mirror mount, comprising:
   a mount body, formed as an integrally molded plastic piece, having an interior surface facing and defining an interior chamber, and a periphery shaped to mate with an external surface of a vehicle body to which the mount body is attachable in a manner such that the interior surface of the mount faces the external surface, the interior chamber being constructed so that when the mount body is mounted to the external surface of the vehicle body the interior chamber is substantially closed off, the mount body being constructed as a single plastic piece and including a pair of side panels which converge toward one another, from the periphery of the mount body toward and joining each other at a region which defines a nestling region for a mirror pole;
   securing means for fixedly securing the mount body in contact with the external surface of the vehicle body;
   a clamping plate fully disposed within the interior chamber;
   tightening means accessible and operable from an exterior surface of the mount body and effective for engaging the clamping plate and pulling the same toward the interior surface; and the mount body including a plurality of spaced, thickened, reinforced portions flanking the nestling region on its left and right sides and being positioned to limit side-to-side movement of the mirror pole within the nestling region.

4. The mirror mount of claim 3, wherein the spaced, thickened, reinforced portions define access holes for metal tightening screws which are operable to engage the clamping plate.

5. The mirror mount of claim 3, the thickened portions including flats which are configured as rest pads for corresponding flats of the clamping plate.

6. The mirror mount of claim 3, further comprising at least one transversely extending ribs disposed below the thickened portions and acting as a stop which limits the degree of penetration of the mirror pole into the interior chamber of the mount body.

* * * * *